June 12, 1934. G. BLECHSCHMIDT 1,962,267
ELECTROMOTOR ENCLOSED IN A WATERPROOF CASING
Filed March 25, 1932
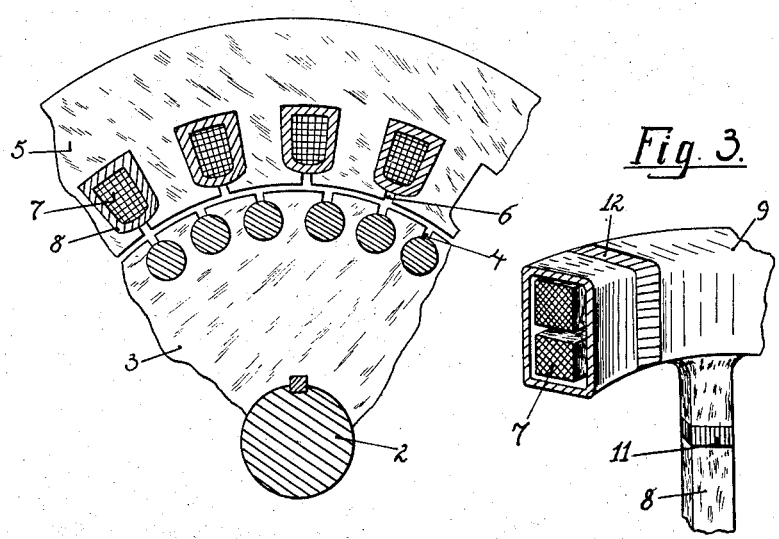
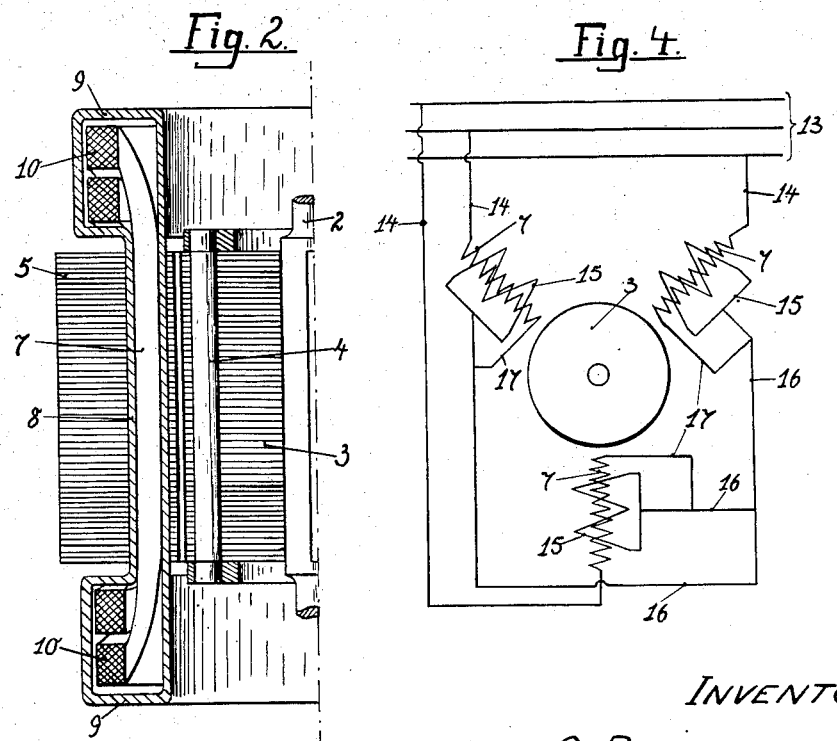
INVENTOR
G. BLECHSCHMIDT
BY
ATTORNEY Patented June 12, 1934

1,962,267

UNITED STATES PATENT OFFICE 1,962,267

ELECTROMOTOR ENCLOSED IN A WATER-PROOF CASING

Günter Blechschmidt, Berlin, Germany, assignor of one-half to Julius Grunwald, Berlin, Germany Application March 25, 1932, Serial No. 601,264
In Germany April 15, 1930

4 Claims. (Cl. 172—280)

In motors driven by an alternating current particularly induction motors, which are to work in damp places or even under water the construction of the runner does not cause any special difficulties. The latter is equipped in a known manner with a cage winding within which no tensions take place which tensions under the action of moisture or on being plunged into water are either damaging or dangerous. On the other hand it is very difficult to keep moisture and water away from the primary winding of the motor. This is absolutely necessary, as in the primary winding, tensions exist and moisture would cause dangerous creeping currents, breaks and short circuits which would damage the primary winding in a very short time.

The present invention relates to an improvement in alternating current motors, particularly known induction motors which have a primary winding encased so as to be gas- and waterproof. According to the invention each winding of the primary winding is tightly surrounded by a tube and each of these tubes is at its ends attached to caps which enclose the winding heads and make them gas and waterproof. Owing to the frequent excess pressure caused by the action of the plunging pump on the column of water to be conveyed, these tubes and caps may conveniently be made of metal or an alloy. By the invention a casing enclosing the windings in the grooves and the winding heads so as to make them gas- and waterproof, is provided which does not interrupt the magnetic field, and is not detrimentally influenced by higher temperatures and which does not enlarge the air space between rotor and stator beyond the allowable limit, as this is not to be avoided in a coating inserted between the two, and which above all guarantees a long duration of the motor.

If one connects the tubes enclosing the separate wires to the caps which tighten the winding heads so as not to conduct electricity, the casing so obtained does not then form a closed coil, so that an induction in the coil cannot take place. The connection still required for tightening the primary coil between the cap and tubes is made of non-conducting material, such as porcelain or rubber.

If, on the other hand, the caps are connected to the tubes so as to conduct electricity, the tube system forms a casing appearing as a kind of short circuit cage which acts as a transformatory intermediate member between the stator and rotor winding. The action of such a motor is such, that the primary winding induces a low tension in the tube system which encloses the primary winding and forms a short circuit cage, so that in the tube system strong currents appear, whose rotary field again influences the short circuit cage of the runner. In consequence of this intermediate transformatory action, it is not necessary to place a transformer between the net and the primary winding as has been done in plunging pump devices, so as to prevent a higher tension than approximately 25 volts being supplied to the primary winding. The omission of such a special transformer is of very special importance not only on grounds of economy, but also on technical grounds, particularly in plunging pumps where a saving of space is aimed at.

In case of greater outputs, however, it might happen that the current which is induced in the tube system as a secondary coil in relation to the stator winding, increases beyond the normal limit allowed, as it represents the short circuit current. Furthermore, in the tube system eddy currents can take place, which cause additional loss. Both drawbacks can for instance be removed in such a way that the resistance of the tightened tube system is relatively increased by using bad conducting metal whereby the intensity of current is reduced to the degree required. The same result is also obtained by placing bad conducting material or even non-conductors only at some points. A similar action can be attained when the ends of the primary winding, otherwise normally connected, are connected to the tube system. The tube system then forms the zero point in relation to the primary winding and carries a current in the same direction as the primary winding, so that the induced current flowing in opposite direction is lessened.

One constructional form of the invention is shown by way of example in the drawing.

Fig. 1 is a part-cross section through the motor,

Fig. 2 is a part-axial section,

Fig. 3 is a perspective illustration of one part of the tube system having the primary winding, but omitting the iron core.

Fig. 4 is a circuit diagram.

The rotor 3 mounted on the shaft 2 is provided in known manner with grooves 4 in which a cage winding is arranged. The stator 5 can consist in known manner, of laminated iron and the rotor 3 is similar. In its grooves 6 the primary winding 7 being attached to the net is arranged, the winding consisting of several wires for each groove. The tubes 8 are placed between this winding 7 and the wall of each groove 6 so as to be insulated to both. The tubes are attached at both sides to caps 9, surrounding the coil heads 10 of the primary winding 7 which for instance are made of metal, whereas the connection, not specially shown, can be made of insulating material, a bad conducting metal or of metal having the same resistance.

In order to reduce the short circuit currents and to avoid eddy currents, in the tube system forming the short circuit cage with the tubes 8, the caps 9 and the primary winding 7, there is inserted on one point a nonconducting material 11 and at another point metal 12 having a smaller conducting capacity. Hence an insertion of a non-conducting or bad-conducting material in other or several places as well as in another form can be provided.

In Fig. 4 a diagram is shown, in which the tube system forms the zeropoint in relation to the primary coil. The primary coil 7 which surrounds the rotor is connected to the conduit net 13 by means of conducting wires 14. The primary coil 17 is enclosed by the tubes and the caps of the tube system, which are shown in the diagram by the short circuit windings 15 and the conducting wires 16. The ends of the primary coil 7 are connected to the conducting wires 16 by conducting wires 17, so that the short circuit windings 15 and the conducting wires 16 form the zeropoint in relation to the primary coil 7.

I claim as my invention:

1. In an alternating current electro-motor, a rotor having a cage winding, a stator, primary windings in said stator, fluid-proof metal tubes enclosing the winding cords of the primary winding, fluid-proof metal caps enclosing the coil heads of the primary winding, and means associated with said tubes and caps to reduce short circuit and eddy currents therein.

2. An alternating current electro-motor according to claim 1, wherein the means for reducing short circuit and eddy currents are short sections of non-conducting material inserted in the metal caps and tubes.

3. An alternating current electro-motor according to claim 1, wherein the means for reducing short circuit and eddy currents are short sections of metal inserted in the tubes and caps, said short sections being made of a material having a relatively smaller conducting capacity.

4. An alternating current electro-motor according to claim 1, wherein the means for reducing short circuit and eddy currents are short sections of metal inserted in the tubes and caps, certain of said short sections being made of non-conducting material and others of said sections having conducting capacity less than that of the caps and tubes.

GÜNTER BLECHSCHMIDT.